(No Model.)
A. D. LINN & A. A. LYTLE.
EGG CARRIER.
No. 426,943. Patented Apr. 29, 1890.
Fig. 1.
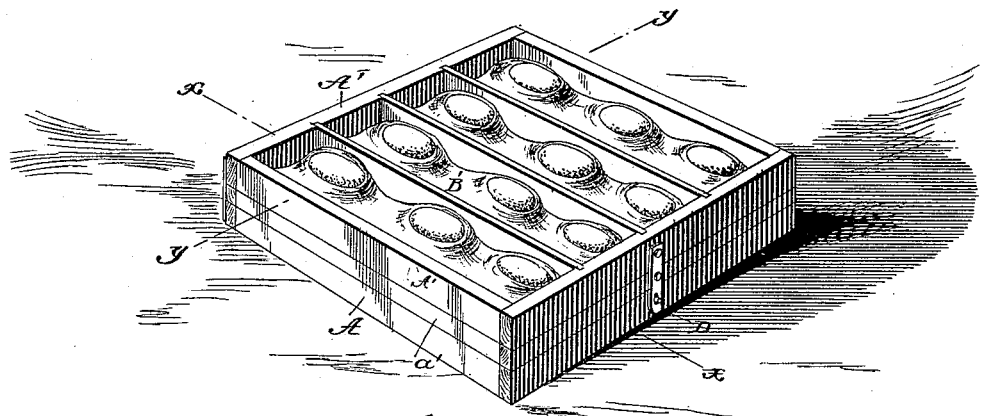
Fig. 2.
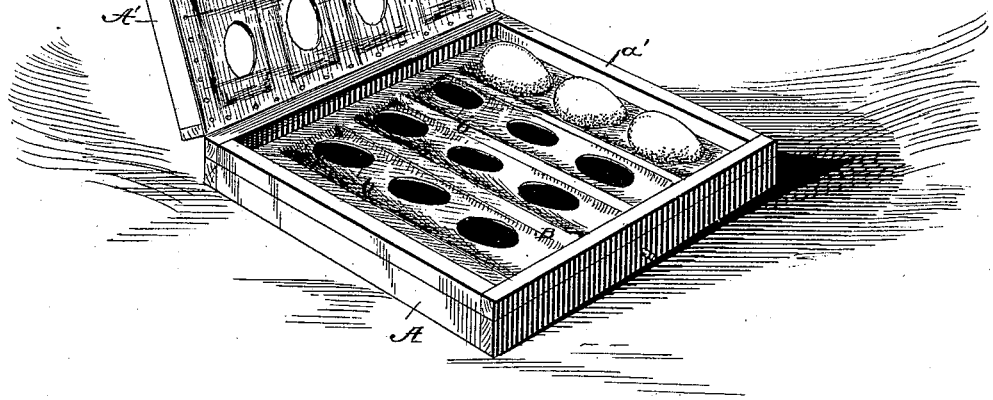
Fig. 3.
on line x-x
Fig. 4.
on line y-y
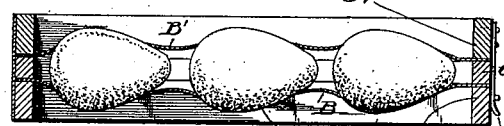
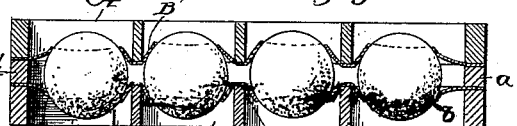
THE NORRIS PETERS CO., PHOTO-LITHO., WASHINGTON, D. C.

UNITED STATES PATENT OFFICE.

ALLEN D. LINN AND ALTON A. LYTLE, OF GRAND RAPIDS, MICHIGAN.

EGG-CARRIER.

SPECIFICATION forming part of Letters Patent No. 426,943, dated April 29, 1890.

Application filed February 14, 1890. Serial No. 340,454. (No model.)

*To all whom it may concern:*

Be it known that we, ALLEN D. LINN and ALTON A. LYTLE, of Grand Rapids, in the county of Kent and State of Michigan, have invented certain Improvements in Egg-Carriers, of which the following is a specification.

The aim of this invention is to provide an inexpensive, durable, and compact carrier or crate which may be quickly filled and which will admit of the eggs being readily candled and of the crate being roughly handled and laid on either of its sides without danger of fracturing the eggs.

To this end it consists in a separable frame, its two parts open or uncovered at the back, with two perforated sheets of canvas or like material in the interior to embrace and hold the eggs, and with cross-bars which sustain the canvas in such manner that it presents channels into which the eggs may be quickly laid on their sides in proper position to be candled through the openings.

In the accompanying drawings, Figure 1 is a perspective view of our improved carrier as it appears when closed and filled with eggs. Fig. 2 is a perspective view of the carrier as it appears when opened to permit the introduction or removal of the eggs. Fig. 3 is a transverse section of the closed carrier on the line $x$ $x$ of Fig. 1. Fig. 4 is a similar section on the line $y$ $y$ of Fig. 1.

Referring to the drawings, A represents a rectangular base-frame containing a series of parallel cross-bars $a$ flush with its upper face. B represents a sheet of canvas or similar flexible material covering the entire upper surface of the frame A and tacked, cemented, or otherwise secured thereto at the margin. This pliable sheet B, which receives support also from the cross-bars, is provided between the bars with elongated openings $b$, equal in number to the number of eggs which the carrier is intended to receive, but of a size considerably smaller than the eggs.

$a'$ is a second rectangular frame, corresponding in size with the frame A and secured firmly upon the latter above the pliable sheet. The parallel bars beneath the sheet B cause the latter to present a series of channels or furrows of such shape and size that when the eggs are placed therein they at once turn down upon their sides over the openings. This not only facilitates the filling of the case—a very important matter in wholesale operations—but causes the eggs to be held in the proper position to admit of the light being projected transversely through them in the candling operation. The bars also shut off the side rays of light, so that in candling the eggs the illuminated portions will stand out in strong contrast to the remainder. The frame $a'$ is in effect but an upward continuation of the frame A, but is without the cross-bars.

A' is a top frame, a duplicate in all respects of the base-frame. This top frame is hinged at one side to the frame $a'$, and is provided on the under face with a canvas or other pliable sheet B', containing perforations which register with those in the lower sheet, so that when the frames are closed together the perforations of the upper and lower sheets stand directly opposite each other, with a considerable space between the two sheets.

In filling the carrier the top frame is turned back, as shown in Fig. 2, and the eggs laid upon their sides over the openings in the canvas sheet B, it being unnecessary to observe any special care or attention in the arrangement of the eggs other than to see that they fall into the openings. After the eggs are in place the upper frame is turned down, the effect of which is to confine the eggs between the two canvas sheets. Owing to the sagging of the sheets between the cross-bars and to the fact that the eggs project slightly between the openings in the two sheets, they are confined securely in place, so as to prevent them from coming in contact with each other, while at the same time their support is of an elastic or yielding nature, in order that the crate may be freely handled or turned in all directions without danger of fracturing the eggs.

The cross-bars are of importance in that they hold the canvas downward between the eggs, thus producing furrows or channels in the canvas to prevent the eggs from shifting laterally. On one side the carrier is provided with an ordinary spring-latch D or other suitable means for keeping it closed. The hinge may be of any suitable construction; but we find that a sheet of canvas glued to the frame answers an excellent purpose.

The essence of our invention resides in providing a frame with pliable sheets and with cross-bars to force the canvas between the rows of eggs, and it is manifest that the details of construction may be variously modified within the range of mechanical skill, provided only the foregoing characteristics are retained.

One of the chief advantages of our carrier lies in the fact that it is an exceedingly convenient means of candling the eggs—that is, for testing them by transmitted light to ascertain their soundness. As each egg is slightly exposed on both sides through the openings, while the canvas serves to exclude light from the remaining portions, it is found that the candling operation may be carried on with great rapidity.

It is to be particularly noted that the frame and the cross-bars lying outside of the canvas sheet extend beyond the upper surfaces of the eggs, so that the frames may be laid upon their sides and upon flat surfaces without danger of fracturing the eggs.

Our carriers are commonly made of a size suitable to hold one dozen eggs each. Thus made they are adapted to be conveniently handled and readily packed in crates or holders, and in the case of retailers it may serve as a convenient means of distributing the eggs to consumers.

Having thus described our invention, what we claim is—

1. The egg-carrier consisting of the separable frame provided with the two pliable perforated sheets and with a series of cross-bars sustaining the sheets and giving the surface a channeled form, whereby the eggs are caused to lie upon their sides between the sheets.

2. In an egg-carrier, the two-part separable frame open or uncovered at the outer faces, in combination with the parallel perforated sheets therein and the series of cross-bars sustaining the sheets between the rows of openings in a channeled form, whereby the eggs are caused to lie upon their sides between the sheets and the carrier adapted for use in candling them.

In testimony whereof we hereunto set our hands this 14th day of January, 1890, in the presence of two attesting witnesses.

ALLEN D. LINN.
ALTON A. LYTLE.

Witnesses:
HENRY J. FELKER,
LOIS L. FELKER.